United States Patent [19]

Starling

[11] Patent Number: 4,895,581
[45] Date of Patent: Jan. 23, 1990

[54] TWO STAGE AIR FILTRATION SYSTEM

[75] Inventor: Bobby L. Starling, Charlotte, N.C.
[73] Assignee: Pneumafil Corporation, Charlotte, N.C.
[21] Appl. No.: 336,883
[22] Filed: Apr. 12, 1989
[51] Int. Cl.⁴ ............................................ B01D 46/04
[52] U.S. Cl. .................................... 55/283; 55/213; 55/302; 55/338; 55/350; 55/385.2; 55/429
[58] Field of Search ................ 55/213, 215, 283, 302, 55/315, 350, 385.2, 429, 430, 432, 338

[56] References Cited

U.S. PATENT DOCUMENTS

| | | | |
|---|---|---|---|
| 4,217,116 | 8/1980 | Seevan | 55/283 X |
| 4,461,663 | 7/1984 | Bodovsky | 55/283 |
| 4,759,781 | 7/1988 | Olson | 55/302 X |
| 4,778,491 | 10/1988 | Yow | 55/283 X |

*Primary Examiner*—Charles Hart
*Attorney, Agent, or Firm*—Shefte, Pinckney & Sawyer

[57] ABSTRACT

A two stage filtration system for removing textile waste materials and the like from transport air. The first stage includes a preseparator having a cylindrical screen and an inlet at the interior portion of the cylindrical screen and an outlet on the outside portion of the screen, and the outlet portion is in open communication with a panel filter for further cleaning. Large waste particles are separated by the cylindrical screen and contained in a compartment therebeneath. A second stage filter is provided which includes a generally rectangular housing having a flat filter element extending diagonally thereacross, a small fan is provided for diverting a relatively small portion of the main air in the first stage to carry the collected waste particles from the first stage to the bottom face of the flat filter in the second stage. The waste material collected on the bottom surface of the flat filter is permitted to flall to the bottom wall of the filter unit, such bottom wall being selectively pivoted to an open position to automatically dump the collected waste materials therefrom.

9 Claims, 5 Drawing Sheets

TWO STAGE AIR FILTRATION SYSTEM

BACKGROUND OF THE INVENTION

The present invention relates generally to a two stage air filtration system for removing relatively large particles of materials entrained in an air stream, such as a system used in textile processing environments where large particles of waste material are generated by the textile processing equipment and carried away in an air stream.

As is well known in the textile field, various operations included in textile processing inherently tend to generate textile waste materials which vary from fine dust to relatively large particles of waste. It is common practice to operate large numbers of textile processing machines in the same general area, such as carding machines in a carding room, each of which is usually individually connected to a central waste collection system that utilizes large volumes of air flow to entrain the waste generated by the machines and carry it away from the machines. Additionally, it is common practice to recirculate the air within a textile processing area for the purpose of removing waste therefrom that could be hazardous to personnel working in the area and that could adversely affect the operation of the textile operating equipment. Additionally, this recirculated air must be "conditioned" to provide the proper operating environment for the textile machines and the textile materials being processed, such as maintaining the temperature and humidity of the recirculated air within predetermined ranges using conventional air conditioning equipment designed for this purpose.

In many textile mills, systems typically utilize large volumes of air (e.g. 50,000 c.f.m.) to entrain and carry away the waste as discussed above, and this air with entrained waste is transported through conduits to equipment designed to remove the waste from the air and return at least most of the cleaner air back to the textile processing area.

One commonly employed system used for this purpose is a two stage system that includes a first stage preseparator having a large cylindrical filter element disposed in a housing, and the air to be cleaned is introduced at the inside surface of the cylindrical filter in a direction generally tangential thereto, whereby the large waste particles in the air are removed by the filter as the air flows outwardly therethrough. These large waste particles fall to the bottom of the filter and are collected there, but the air passing through the filter, which is relatively porous, still has some fine dust entrained therein. Roughly ninety-five percent of the incoming air passes through the filter and it is then caused to flow through a panel filter, such as a panel filter of the type disclosed in U.S. Pat. No. 4,725,292 which removes essentially all of the fine dust from the air. This cleaned air is then returned directly to the main air recirculation system, and it is to be noted that this returned air is still "conditioned," at least partially, so that it does not require nearly as much "conditioning" as would drawing in ambient air from the outside, thereby rendering the system more efficient. The other roughly five percent of the original air is directed away from the upstream side of the cylindrical filter to carry with it the aforesaid relatively large waste particles collected by the filter, and this small quantity of air is introduced into a second stage filter, or fiber extractor, such as the device disclosed in U.S. Pat. No. 4,502,874. As explained in greater detail in the patent, fiber extractors of this type are designed for continuous operation and, consequently, they are large so as to include two duplicate flow paths for the air to be cleaned and valves operated by sensors for alternately directing the air through one flow path while the other flow path is taken off line and the filter is cleaned of collected waste particles, which are then allowed to drop from the housing of the fiber extractor. The cleaned air is then generally discharged to the atmosphere.

While two stage filtration systems of the foregoing type are generally satisfactory, they suffer two significant drawbacks. First, the fiber extractor itself, because it is designed for continuous operation, is relatively expensive to produce and operate primarily because of the large housing required to provide the necessary alternate flow paths for the air, and the control elements required to maintain the equipment in continuous operation. Secondly, in known systems using such fiber extractors, the large quantities of waste removed from the air is appropriately processed for disposal, such as by dumping it into a baling machine, but the cleaned air is exhausted into the atmosphere and any residual "conditioning" of such air (e.g. temperature and humidity levels) are lost. Therefore, make up air for replacing this exhausted air in the general textile environment must be drawn in from the atmosphere and passed through conditioning equipment, all of which increases the capital and operating expenses of the system as a whole because larger capacity conditioning equipment must be provided and operated.

Another known two stage filtration system employs a preseparator of the same general type as that described above, and, instead of using a fiber extractor, the small quantity of air that is diverted with the large particles of waste material is conducted through a conduit from the upstream side of the cylindrical filter of the preseparator to the inlet side of a conventional condenser. As is well known in the art, these conventional condensers include a filter screen that has a cylindrical configuration and that is rotated about its axis by a motor so that relatively large waste particles entrained in the input air stream collect on the surface of the rotating screen as a mat, and this mat is doffed or peeled off of the rotating screen by a stationary doctor blade for subsequent removal from the condenser. In this system, the cleaned air is returned to the preseparator at a point downstream of the filter thereof and recombined with the main flow of air through such filter for further processing by the panel filters as described above.

While the cleaned air is not lost to atmosphere as is the case in systems of the first type described above, this second system has its own drawbacks resulting from the use of condensers. Condensers are relatively expensive to make and operate, particularly because of the fact that it includes a rotating filter screen and because of the tolerances required to direct the air flow properly through the moving filter and to properly doff the mat from the rotating filter screen. Moreover, for much the same reasons, condensers tend to be somewhat undependable over long periods of continuous operation. Finally, condensers have relatively large operating costs resulting from the motor that is required to rotate the filter screen and from relatively large pressure drop (e.g. a maximum of about five inches of water) across the rotating filter which requires large blowers to move the air through the rotating filter.

By contrast, the two stage air filtration system of the present invention provides a system that is less expensive to fabricate and less expensive to operate, and/or that is more dependable in operation because of the simplicity of its design and operating characteristics.

SUMMARY OF THE INVENTION

In accordance with the present invention, a filter system is provided for removing textile waste materials and the like entrained in a flow of transport air, such system including a first stage air separator for initially separating large particles of the waste materials from the air flow, and a second stage air filter for additionally separating and collecting such large particles of waste material. The first stage air separator includes a first filter having a permeability for preventing the passage therethrough of large particles of waste material, an air inlet for receiving the transport air flow and directing it through the filter, a collector located at the upstream side of the filter for collecting the large particles of waste material, and an outlet located downstream of the filter for exhausting air after it has passed through the filter. The second stage air filter includes a housing having a generally flat second filter extending thereacross to divide the housing into an inlet portion located below the second filter and an outlet portion located above such filter, a first conduit that interconnects the collector portion of the first stage and the inlet portion of the second stage housing, and a second conduit interconnecting the outlet portion of the housing with the air outlet of the first stage separator. A blower is provided for causing a predetermined small portion of the air flow and the collected particles of waste in the first stage to flow from the collection portion of the first stage through the first conduit, then through the second filter to separate the waste material from the air flow, and then causing the cleaned air to flow back into the air outlet of the first stage to be combined with the air flow that has passed through the first stage filter. Also, the second stage filter includes an arrangement for periodically removing the large particles of waste material that collect in the inlet portion of the second stage housing.

In the preferred embodiment of the present invention, the housing of the second stage filter is comprised of a generally rectangular enclosure with the flat filter extending generally diagonally thereacross, and the housing includes a movable bottom wall disposed beneath the filter and a selectively operable device for moving the movable wall portion between a first position completing the enclosure of the housing and collecting the large waste particles thereon, and a second position providing an opening in said housing to permit removal of the large waste particles. To assist in separating the waste particles from the filter, a conduit may be provided in the upper or outlet portion of the housing so as to extend along the length of the filter, and this conduit includes a plurality of openings directed toward the filter so that compressed air can be introduced into the conduit to produce a burst of compressed air from each of the openings in the conduit directed toward the filter so as to pass through the filter and remove any waste particles clinging to the bottom or inlet side of the filter.

Also, in the preferred embodiment of the present invention, a valve is positioned in each of the first and second conduits of the second stage filter, such valves being normally opened during operation of the apparatus and being selectively closed to isolate the filter of the second stage from its blower during cleaning of the filter element and removal of the waste particles from the housing as described above. In this regard, the present invention includes a control, preferably in the form of a central processing unit (CPU), which establishes a cleaning cycle for the second stage filter by operating, in sequence, to first stop the blower and close the valves in the first and second conduits, then to cause the source of compressed air to flow into the conduit in the housing to clean the second filter, then energize the operating means for the movable wall portion of the housing to remove waste particles therefrom, then energize the operating means to close the movable wall, and then reopen the valves in the first and second conduits and restart the blower.

DESCRIPTION OF THE PREFERRED EMBODIMENT

Figure 1:
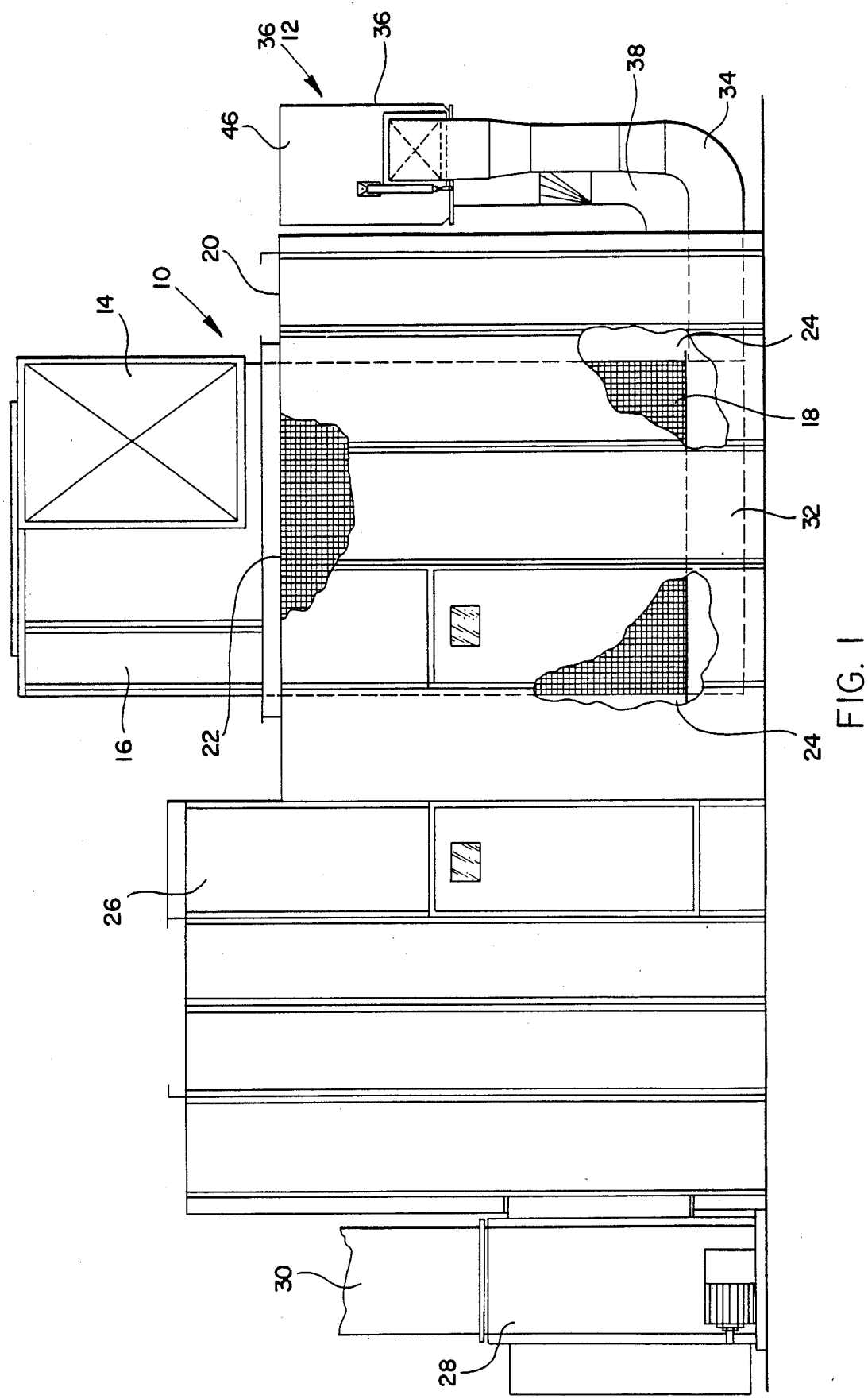
FIG. 1 is a side elevation view illustrating the two stage air filtration system of the present invention.
Figure 2:
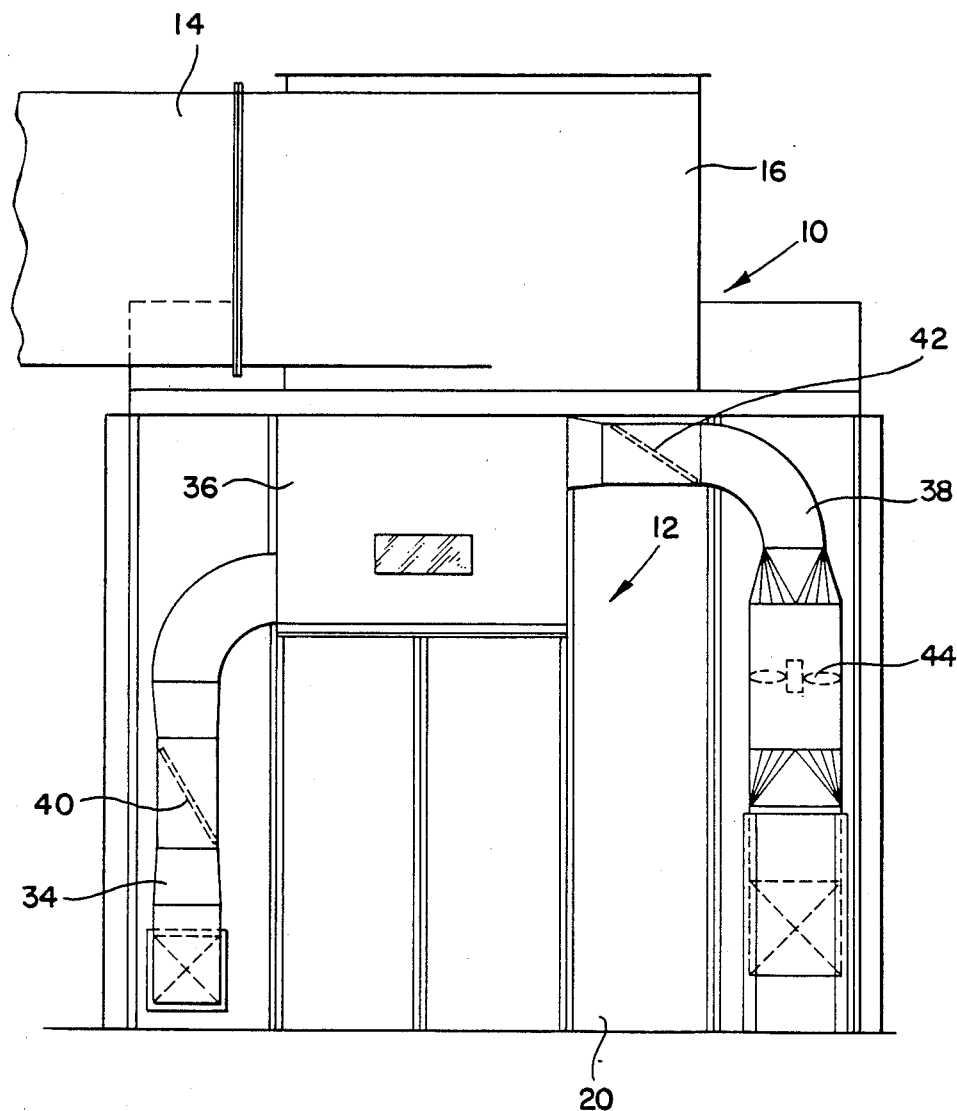
FIG. 2 is an end view of the system illustrated in FIG. 1.
Figure 3:
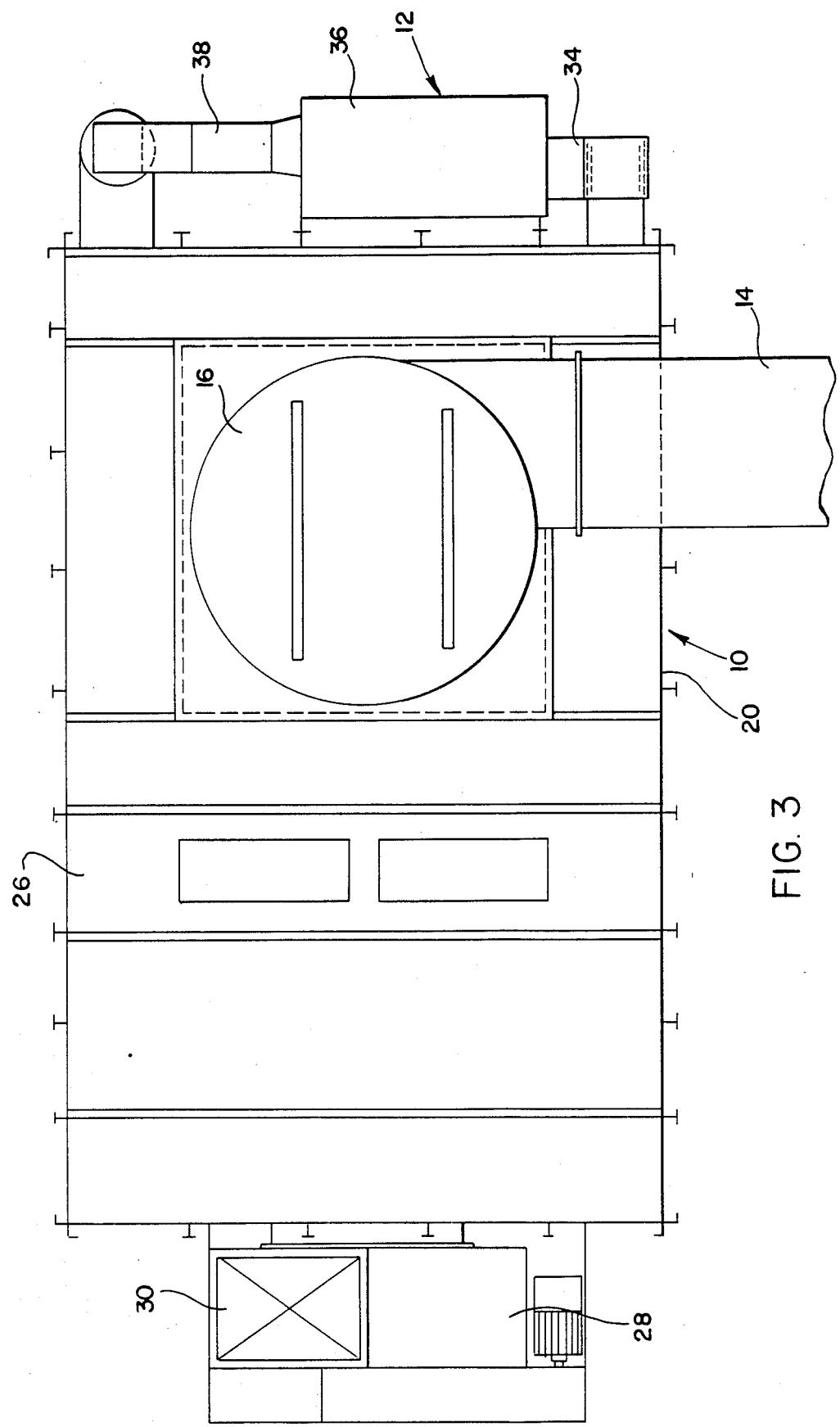
FIG. 3 is a plan view of the system illustrated in FIG. 1.

Looking now in greater detail at the accompanying drawings, FIGS. 1-3 illustrate the air filtration system of the present invention which includes a first stage air separator, generally indicated by the reference numeral 10, and a second stage air filter, generally indicated by the reference numeral 12.

The first stage 10 includes a large inlet duct 14 arranged to introduce a flow of air with waste materials entrained therein to a generally cylindrical inlet compartment 16, the inlet duct 14 being arranged to cause the air to flow into the inlet chamber 16 generally tangentially thereto so that the air flows around the walls of the inlet chamber in a generally circular flow pattern. The inlet compartment 16 is located above and coaxially with a large cylindrical filter screen 18 which divides the first stage housing 20 into an upstream or inlet portion 22 on the inside of the cylindrical filter 18, and an outlet portion at the downstream side of the filter 18 and defined by the enclosure of the housing 20. The outlet portion 24 is in open communication with a large panel filter 26, which is preferably a panel filter of the type described in detail in U.S. Pat. No. 4,725,292, and a large fan 28 is provided for continuously circulating large quantities of the transport air through the entire system, the fan 28 having an outlet 30 through which cleaned air is directed back into the main air flow system. In a typical application of the present invention, the inlet duct 14 will receive transport air from a plurality of textile processing machines, such as carding machines as described above, and this transport air will have entrained therein a substantial amount of waste material, both in the form of large particles of waste material, fine dust, and other foreign matter. The system fan 28 draws this transport air through the large cylindrical filter 18, from the upstream or inside surface thereof to the downstream or outside surface thereof, and the large waste particles in the air, which constitute approximately ninety-nine percent by weight of all of the waste materials, are separated from the air by the cylindrical filter 18 which has a permeability designed for this purpose, and the separated waste material at the inside of the cylindrical filter 18 falls by gravity and under the influence of the swirling transport air into a collection compartment 32 located immediately below the filter 18. The air which is passed through the filter 18 still contains some fine dust and similar foreign matter which is removed therefrom as such air passes through the panel filter 26. The thus clean air exits through the fan outlet 30 where it is returned to the main air system of the textile processing operation, which will usually include passing the air through conventional conditioning operations. However, it is to be noted that the air which is returned to the main system is the same air that was withdrawn from the textile processing environment, such as from carding machines, and therefore this air still retains much of the desired humidity and temperature conditioning which it had before it was withdrawn for cleaning.

The second stage filter 12 is provided for efficiently removing the large particles of waste material collected in the collection compartment 32, and includes a first inlet conduit 34 extending from the collection compartment 32 to a filter unit 36 and an outlet conduit 38 that extends from the filter unit 36 back to the housing 20 of the first stage in open communication with the outlet portion 24 of the first stage. Flap valves 40 and 42 are located in the inlet and outlet conduits 34 and 36, respectively, such valves being normally opened and selectively closed by a conventional pneumatic cylinder controlled by an electrically actuated solenoid valve in a manner to be described presently. Also, a fan 44, which is much smaller than the system fan 28 described above, is located in the outlet conduit 38 for moving air through the second stage.

Figure 4:
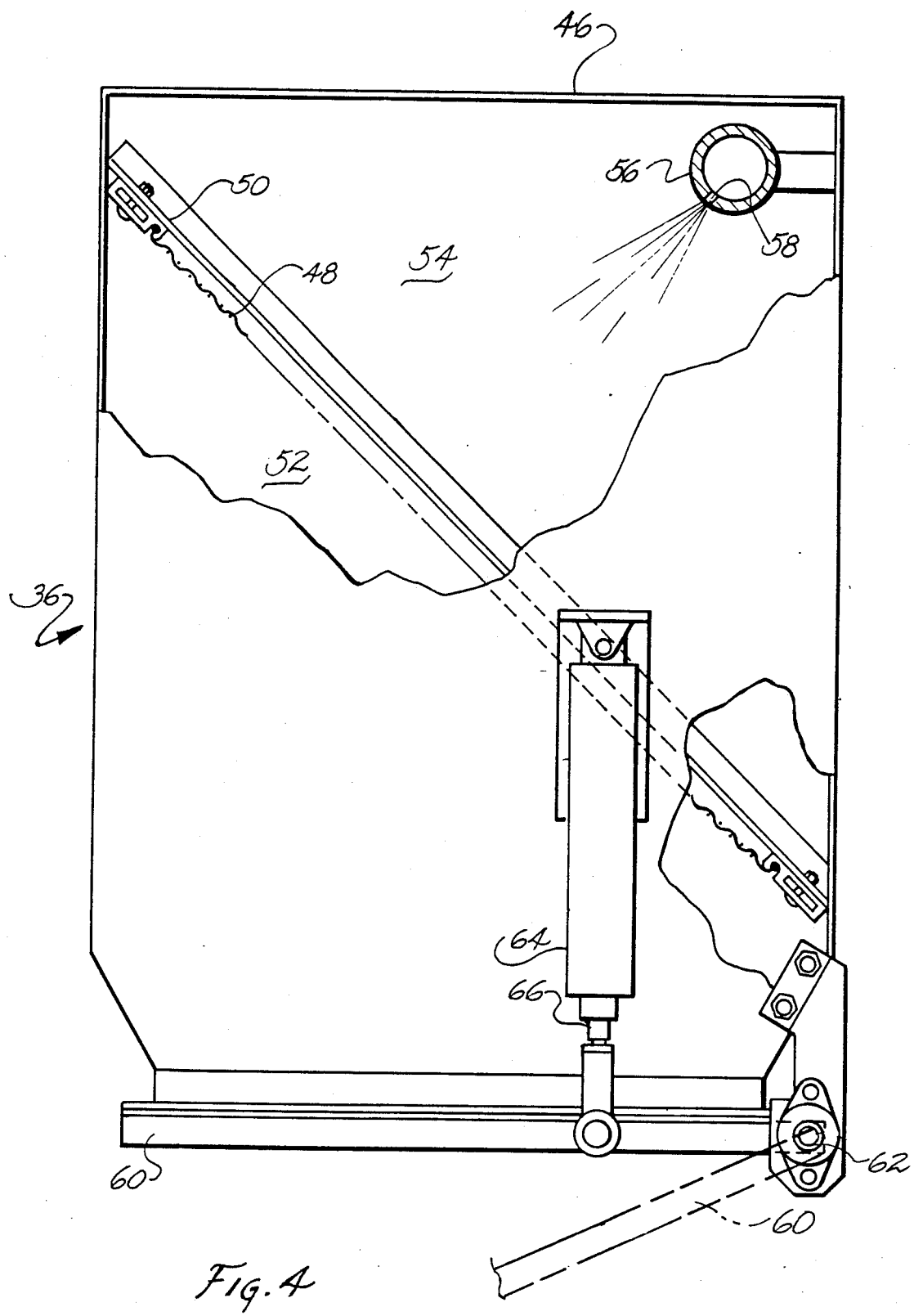
FIG. 4 is a detailed side elevational view, partly in section, illustrating the filter housing of the second stage filter.

As shown in greater detail in FIG. 4, the filter unit 36 includes a generally rectangular housing 46 having a flat filter element 48 mounted on wall brackets 50 to extend angularly or generally diagonally across the interior of the housing 46 to divide it into an inlet chamber 52 located beneath the filter element 48 and in communication with the inlet conduit 34, and an outlet chamber 54 located above the filter element 48 and in communication with the outlet conduit 38. A pipe 56 is located in the outlet chamber 54 and extends along the upper corner of the housing 46 and generally along the length of the filter element 48, the pipe 56 being provided with a plurality of sized apertures or openings 58 located in a direction facing approximately the midpoint of the filter element 48. The pipe 56 is connected to any convenient source of compressed air (not shown) which may be introduced into the pipe 56 in pulses of high pressure air that exit through the openings 58 to direct bursts of air toward the filter element 48 and in a direction opposite to the normal flow of air through the filter element 48, such pulses acting to assist in cleaning the filter element 48 by dislodging particles of waste material collected on the upstream or lower face of the filter element 48 so that such particles will fall by gravity to the bottom wall 60 of the housing 46. As best seen in FIG. 4, the bottom wall 60 is mounted at one of its ends to a pivot connection 62, and one or more conventional pneumatic operating cylinders 64 are mounted on the exterior walls of the housing 46 with the piston 66 of each pneumatic cylinder 64 being connected directly to the bottom wall 60 for moving it between a normally closed position, shown in full lines in FIG. 4, at which it completes the enclosure of the housing 46 by resting against a seal 68, and an opened position, as shown in dotted lines in FIG. 4, whereby waste materials collected in the housing 46 are dumped automatically therefrom.

In a typical operation of the two stage filtering system of the present invention, the system fan 28 is designed to circulate approximately 50,000 c.m.f. of air, with entrained waste particles, through the first stage 10. The smaller fan 44 in the second stage is selected to draw off approximately five percent of the total air being circulated through the first stage, and it is this five percent which circulates through the second stage 12 with the waste materials in the collection compartment 32. This relatively small air flow passes through the filter unit 36 so that the large waste particles carried from the collection compartment 32 are collected on the lower or upstream surface of the filter element 48, and the cleaned air is then reintroduced into the outlet portion 24 of the first stage housing 20, at which point it is recombined with the main air flow through the first stage and carried to the panel filter 26 for further cleaning as described above.

Figure 5A:
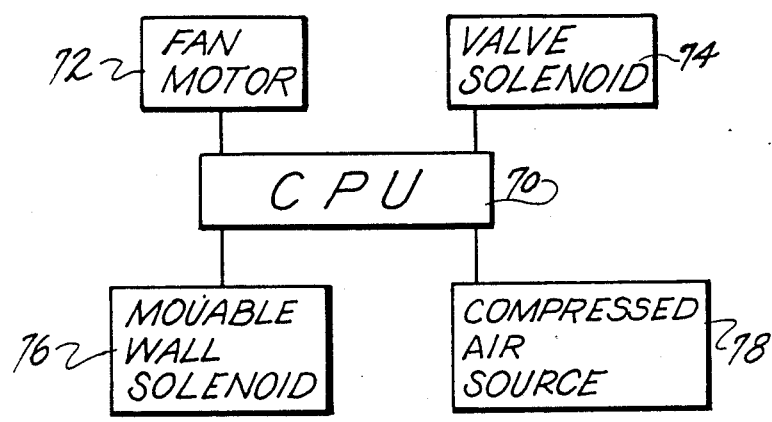
FIG. 5A is a diagrammatic illustration of the control circuit for the second stage filter.

The air flowing upwardly within the housing 46 will result in entrained waste materials being deposited on the bottom surface of the filter element 46 as described above, and this air flow will tend to hold the waste materials in place on the surface of the filter rather than allowing the waste materials to fall to the bottom wall 60. Accordingly, in accordance with a further feature of the present invention, a control system is provided for periodically cleaning the filter element 48, such control system being diagrammatically illustrated in FIGS. 5A and 5B. As shown in FIG. 5A, a programmable CPU 70 is provided to operate and control a conventional motor 72 for the blower 44, solenoids 74 for the two valves 40 and 42, a solenoid 76 for operating the pneumatic cylinder 64 which pivots the movable bottom wall 60, and a compressed air source 78 which provides pulses of compressed air to the compressed air pipe 56.

Figure 5B:
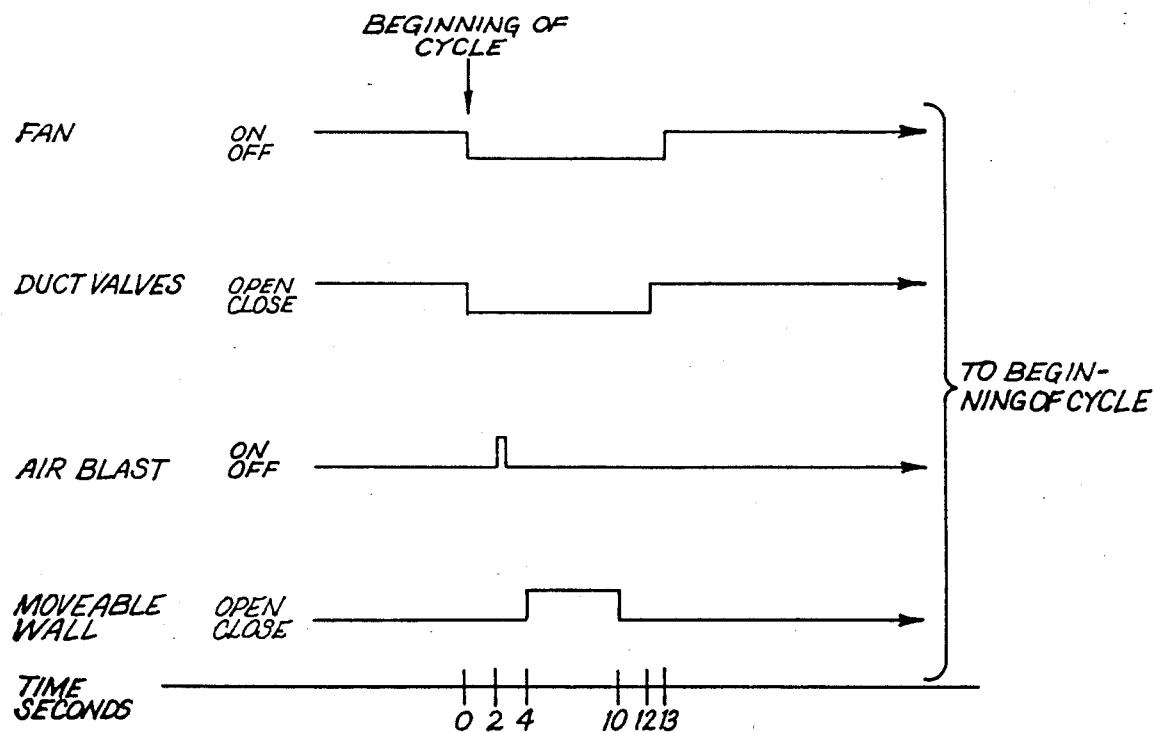
FIG. 5B is a diagram illustrating the sequence of operation of various components included in the second stage filter.

As shown in FIG. 5B, the CPU 70 operates the aforesaid components connected thereto in a predetermined sequence. When a cleaning cycle begins (the 0 second point in FIG. 5B), which may be determined on a timed basis or when the pressure drop across the filter element 48 reaches a predetermined maximum, the motor 72 of the fan 44 is de-energized and the solenoids 74 for both of the valves 40 and 42 are operated to close such valves, so that the filter unit 36 is isolated from the fan 44 and no air flows upwardly through the filter element 48 in a manner that would hold the waste material thereagainst as described above. Two seconds later, the compressed air source 78 is energized for a very short period of time so that a pulse of air is generated through each of the openings 58 in the pipe 56 to dislodge waste materials from the bottom surface of the filter element 48, whereupon the dislodged waste particles fall to the bottom wall 60. At the 4 second time interval, the solenoid 76 is operated to cause the operating pneumatic cylinder 64 to pivot the movable wall 60 to its open position, and the lower wall is permitted to remain at its open position for approximately six seconds during which all of the waste material collected thereon falls from the housing 46 for collection in any convenient manner, such as collection in a baling machine (not shown) or for manual collection after the waste material is deposited on the floor. The bottom wall 60 is then closed by the solenoid 76 for the operating cylinder 64, and a few seconds later the solenoids 74 are operated, and the valves 40 and 42 are closed, after which the fan motor 72 is re-energized to start the fan 44 to complete the cycle, all as shown in FIG. 5B.

It is to be understood, of course, that the foregoing example is merely illustrative of one typical application of the present invention, and that the present invention is not limited in any way to this particular operation, which can be varied extensively to adapt the system to other applications without department from the scope of the present invention.

It will be apparent from the foregoing description that the present invention provides substantial advantages as compared with the similar systems which are presently known, as described above. More specifically, the simplicity of the construction and operation of the filter unit 36 results in a substantial savings in capital costs and power consumption when compared to either the known fiber extractor system or the known condenser system used as second stages. In terms of capital costs, it is believed that the present invention represents a savings of approximately fifty percent in terms of the overall costs of the filter unit 36 as compared to a fiber extractor, and a cost of approximately one-third of the cost of a condenser. Moreover, the filter unit 36 is considerably more dependable than a condenser because it includes only one moving part, namely the pivoted wall 60 which is easy to construct and easy to operate, and it is cleaned by simply isolating the filter unit 36 and removing the collected waste materials from the bottom wall 60. In this same regard, the diagonal or angular positioning of the flat filter element 48, with or without the compressed air pipe 56, assists in causing the waste materials to fall therefrom, which is a significant advantage as compared with the known fiber extractor described above. Finally, the filter unit 36 operates at a substantially reduced pressure drop, as compared to a condenser, which results in significant energy savings, and these energy savings are compounded by the fact that the drive motor required for rotating the screen filter in a condenser is eliminated in the present invention.

It will therefore be readily understood by those persons skilled in the art that the present invention is susceptible of a broad utility and application. Many embodiments and adaptations of the present invention other than those herein described, as well as many variations, modifications nd equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. A filter system for removing textile waste materials and the like entrained in a fluid flow, such system comprising:
   (a) first stage air separator means for initially separating large particles of said waste material from said air flow, comprising
       (i) first filter means having a predetermined permeability for preventing the passage therethrough of said large particles;
       (ii) air inlet means for receiving said fluid flow and directing it through said first filter means;
       (iii) collection means located at the upstream side of said first filter means for collecting said large particles; and
       (iv) air outlet means located downstream of said first filter means for exhausting said air flow after it has passed through said first filter means;
   (b) second stage air filtering means additionally separating said large particles of waste materials, comprising:
       (i) a housing means having a generally flat second filter means extending thereacross to divide said housing means into an inlet portion below said second filter means and an outlet portion above said second filter means;
       (ii) first conduit means interconnecting said collection means and said inlet portion of said housing;
       (iii) second conduit means interconnecting said outlet portion of said housing and said air outlet means of said first stage separator means; and
       (iv) blower means for causing a predetermined small portion of said air flow and said collected particles of waste to flow from said collection means, through said first conduit means and said second filter means for separating said waste materials from said small portion of said air flow, and for causing said small portion of said air flow to flow from said outlet portion of said housing and back into the air outlet means of said first stage air separator means to be combined with said flow that has passed through said first filter means; and
   (c) waste removal means associated with said second stage air filtering means for permitting said large waste particles to be periodically removed from said inlet portion of said housing means.

2. A filter system as defined in claim 1 and further characterized in that said housing of said second stage filtering means comprises a generally rectangular enclosure, and in that said generally flat filter extends generally diagonally across said enclosure.

3. A filter system as defined in claim 2 and further characterized in that said enclosure includes a movable wall portion located beneath said generally flat filter, and in that selectively operable operating means are provided for moving said movable wall portion between a first position completing the enclosure of said housing and collecting said large waste particles thereon and a second position providing an opening in said housing to permit removal of said waste particles from said housing.

4. A filter system as defined in claim 2 and further characterized in that filter cleaning means is provided within said housing for removing waste materials from said flat filter.

5. A filter system as defined in claim 4 and further characterized in that said filter cleaning means includes a conduit located within said housing and positioned to extend above said flat filter, said conduit having a plurality of openings facing said flat filter and being connectable to a source of pressurized air whereby bursts of air through said openings will be directed toward said flat filter to assist in removing waste materials collected on the upstream face of said flat filter.

6. A filter system as defined in claim 1 and further characterized in that an electrically operated first valve means is located in said first conduit means, and in that an electrically operated second valve means is located in said second conduit means, said first and second valve means being normally open and being simultaneously closed selectively to isolate said second filter means from said blower means during said removal of said large waste particles from said second stage filtering means.

7. A filter system as defined in claim 6 and further characterized in that said housing includes filter cleaning means located in said outlet portion thereof, said filter cleaning means including a conduit connected to a source of compressed air and extending along and above said second filter means and having a plurality of openings therein directed toward said second filter means whereby compressed air in said conduit can be directed toward said second filter to assist in removing waste collected on the upstream surface of said second filter means.

8. A filter system as defined in claim 7 and further characterized by a control system which selectively generates a cleaning cycle for said second filter means by operating, in sequence, to stop said blower means and close said first and second valve means, then cause said source of compressed air to flow into said conduit to clean said second filter, then operate said waste removal means, and then open said first and second valve means and start said blower means.

9. A filter system for removing textile waste materials and the like entrained in a fluid flow, such system comprising:
   (a) first stage air separator means for initially separating large particles of said waste material from said air flow, comprising
      (i) first filter means having a predetermined permeability for preventing the passage therethrough of said large particles;
      (ii) air inlet means for receiving said fluid flow and directing it through said first filter means;
      (iii) collection means located at the upstream side of said first filter means for collecting said large particles; and
      (iv) air outlet means located downstream of said first filter means for exhausting said air flow after it has passed through said first filter means;
   (b) second stage air filtering means additionally separating said large particles of waste materials, comprising:
      (i) a generally rectangular housing means having a generally flat second filter means extending generally diagonally thereacross to divide said housing means into an inlet portion below said second filter means and an outlet portion above said second filter means;
      (ii) first conduit means interconnecting said collection means and said inlet portion of said housing;
      (iii) second conduit means interconnecting said outlet portion of said housing and said air outlet means of said first stage separator means; and
      (iv) blower means for causing a predetermined small portion of said air flow and said collected particles of waste to flow from said collection means, through said first conduit means and said second filter means for separating said waste materials from said small portion of said air flow, and for causing said small portion of said air flow to flow from said outlet portion of said housing and back into the air outlet means of said first stage air separator means to be combined with said flow that has passed through said first filter means;
      (v) a movable wall portion located beneath said generally flat filter, and in that selectively operable operating means are provided for moving said movable wall portion between a first position completing the enclosure of said housing and collecting said large waste particles thereon and a second position providing an opening in said housing to permit removal of said waste particles from said housing;
      (vi) a conduit located within said housing and positioned to extend above said flat filter, said conduit having a plurality of openings facing said flat filter and being connectable to a source of pressurized air whereby bursts of air through said openings will be directed toward said flat filter to assist in removing waste materials collected on the upstream face of said flat filter; and
      (vii) a control system which selectively generates a cleaning cycle for said second filter means by operating, in sequence, to stop said blower means and close said first and second valve means, then cause said source of compressed air to flow into said conduit to clean said second filter, then operate said waste removal means, and then open said first and second valve means and start said blower means.

* * * * *